UNITED STATES PATENT OFFICE.

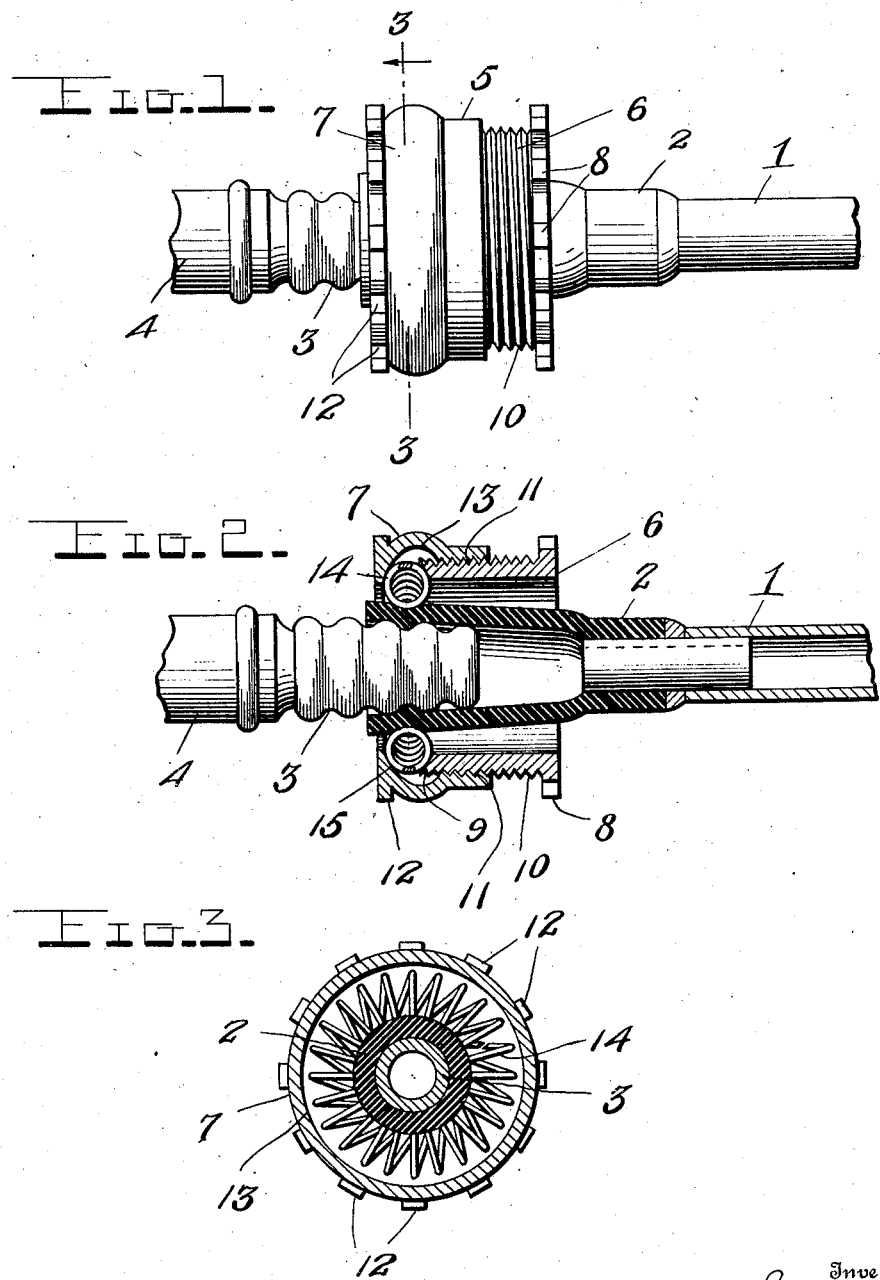

CHARLES SAUTTER, OF WEST HOBOKEN, NEW JERSEY.

GAS-HOSE COUPLING.

No. 923,081.  Specification of Letters Patent.  Patented May 25, 1909.

Application filed November 27, 1908. Serial No. 464,702.

*To all whom it may concern:*

Be it known that I, CHARLES SAUTTER, a citizen of the United States, residing at West Hoboken, in the county of Hudson and State of New Jersey, have invented certain new and useful Improvements in Gas-Hose Couplings, of which the following is a specification, reference being had to the accompanying drawings.

This invention relates to improvements in devices for coupling the rubber tip or end of a gas tube or hose to the nipple of a gas stove, gas burner or the like.

The object of the invention is to provide a simple device of this character which will be strong and durable, which may be applied to any gas hose or tube connection and which will effectively stop the leakage of gas, especially when the rubber tip or end of the hose has become stretched and worn.

With the above and other objects in view, the invention consists of the novel features of construction and the combination and arrangement of parts hereinafter fully described and claimed, and illustrated in the accompanying drawings, in which—

Figure 1 is a side elevation of the improved coupling or clamping device showing the same in use; Fig. 2 is a longitudinal section; and Fig. 3 is a transverse section taken on the plane indicated by the line 3—3 in Fig. 1.

In the drawings 1 denotes a gas hose or tube and 2 the usual rubber tip applied to its ends for the purpose of connecting it to the tapered nipple 3 of the gas pipe 4 of a gas stove, drop light, or the like or to the end of a gas pipe or connection of any description.

5 denotes the improved coupling or clamping device which is adapted to clamp the rubber tip or end 2 of the hose upon the nipple 3 to prevent leakage of gas. The device consists of two members 6, 7 sleeved together and having a screw threaded engagement. As illustrated, both members are tubular to receive the rubber tip 2 and their exterior surfaces may be provided with annular rows of radiating fingers or projections or otherwise shaped to permit them to be readily grasped between the fingers and turned with respect to each other to tighten or loosen the coupling. The inner member 6 has the fingers 8 at one of its ends while its other end 9 is beveled and externally screw threaded, as shown at 10. The outer member 7 has one of its ends internally screw threaded, as at 11, to receive the screw threads 10 and the fingers or projections 12 are formed at its opposite end. At the last mentioned end of the member 7 is formed an enlarged portion or annular channel 13 which forms a seat for a clamping ring 14. The latter is preferably in the form of a coil spring bent into circular form and sprung into the seat 13, said seat being of less depth than the diameter of the spring whereby the beveled end 9 of the member 6 will engage the spring upon one side and when the two members are screwed together will force said spring against the outer wall 15 of the seat or channel 13, which wall is beveled outwardly, as clearly shown in Fig. 2 of the drawings. Owing to the elasticity of the spring 14 it will be seen that when the end 9 of the member 6 forces it against the beveled or inclined wall 15 of the seat 13, the spring will be contracted and caused to tightly bind the rubber tip 2 upon the nipple 3, thereby effectively preventing the escape of gas between said parts. By making the clamping ring 14 from a coil spring it will contract readily and adapt itself to the size and shape of the rubber tip 2 and the nipple 3, it will also slip readily over the tip 2 in being adjusted and it will be exceedingly strong and durable. It will be further noted that the peculiar construction of the device renders it exceedingly inexpensive to manufacture, easy to apply and remove and durable and effective for the purpose intended.

Having thus described the invention what is claimed is:

1. A device of the character described comprising two members sleeved together and having a screw threaded engagement, and a coil spring bent into circular form and arranged in one of the members and adapted to be expanded and contracted by the movement of said members with respect to each other.

2. A device of the character described comprising two members sleeved together and having a screw threaded engagement, one of said members being formed with an annular seat having a beveled wall and a coil spring bent into circular form and sprung into said seat and adapted to be engaged by the other member and to be forced against the beveled wall of said seat when the members are screwed together, whereby said spring will be contracted to clamp a hose upon a nipple.

3. The combination with a hose and a nipple projecting into the same, of a clamping device consisting of two tubular members sleeved together and having a threaded engagement, one of the members being formed with an annular seat having a beveled wall, and a coil spring bent into circular form and sprung into said seat, said spring being arranged upon the hose at the point of its engagement with the nipple whereby when said members are screwed together the end of one will engage the spring and force it against the beveled wall of its seat and thereby contract it upon the hose to clamp the latter on the nipple.

4. The combination with an elastic hose and a nipple projecting into the same, of a clamping device consisting of two tubular members, each having notched radially projecting flanges forming finger pieces and one being formed at one end with internal screw threads and at its other end with an enlarged annular channel to provide a seat, the other member having external screw threads to engage the internal threads on the first mentioned one and having its inner end inwardly beveled, and a coil spring bent into circular form to provide a clamping band which surrounds the elastic hose and is arranged in the channel or seat in one member and engaged by the beveled end of the other, whereby said clamping spring is expanded and contracted by the movement of the members with respect to each other.

In testimony whereof I hereunto affix my signature in the presence of two witnesses.

CHARLES SAUTTER.

Witnesses:
 JOHN O. WICHMAN,
 HENRY SEIBEL.